United States Patent [19]

Dillinger et al.

[11] 4,017,040
[45] Apr. 12, 1977

[54] STEERABLE EXTRACTION ROCKET

[75] Inventors: Robert B. Dillinger, Ridgecrest; W. James Stone, China Lake, both of Calif.

[73] Assignee: The United States of America as represented by the Secretary of the Navy, Washington, D.C.

[22] Filed: Jan. 12, 1976

[21] Appl. No.: 648,557

[52] U.S. Cl. .............................. 244/3.22; 60/229; 102/89 R; 239/265.27; 244/122 AD
[51] Int. Cl.² ..................................... F41G 7/00
[58] Field of Search ............ 244/3.21, 3.22, 122 R, 244/122 AD, 141; 239/265.27, 265.29; 60/229; 102/89

[56] References Cited

UNITED STATES PATENTS

| | | | |
|---|---|---|---|
| 2,613,497 | 10/1952 | MacDonald | 60/229 |
| 2,822,755 | 2/1958 | Edwards | 60/229 |
| 2,974,594 | 3/1961 | Boehm | 60/229 X |
| 3,145,531 | 8/1964 | Deutsch | 60/229 X |
| 3,353,354 | 11/1967 | Friedman et al. | 60/229 X |
| 3,648,955 | 3/1972 | Steneel | 244/122 AD |
| 3,740,005 | 6/1973 | Rivers | 244/122 AD |
| 3,802,651 | 4/1974 | Axenborg et al. | 244/122 AD |
| 3,891,166 | 6/1975 | May | 244/3.22 |
| 3,949,676 | 4/1976 | Schmidt | 102/89 |

Primary Examiner—Harold Tudor
Attorney, Agent, or Firm—R. S. Sciascia; Roy Miller

[57] ABSTRACT

A steerable rocket motor for towing a load or extracting an aircrew member from a disabled aircraft, regardless of aircarft attitude or altitude. The rocket motor is formed from a hollow cylindrical thin walled casing containing a high burn rate propellant and having a plurality of rocket nozzles at one end. The rocket nozzles are positioned around the circumference of the rocket body and are angled to thrust outward and toward the load or aircrew member being towed. A thrust control proportions thrust among the plurality of nozzles for controlling the pitch and yaw of the rocket. Position and rate sensing apparatus informs the thrust control regarding rocket attitude to enable the rocket to steer a predefined desirable flight trafectory. One or more lines are attached to the rocket and are adapted to be fastened to the load or aircrew member being towed.

8 Claims, 3 Drawing Figures

STEERABLE EXTRACTION ROCKET

BACKGROUND OF THE INVENTION

1. Field of the Invention

This invention relates to a steerable rocket motor apparatus adapted to tow a load fastened to the rocket by means of a tow line or lines.

2. Description of Prior Art

Recently there has been an increasing demand for lighter, simpler and more effective escape apparatus for crew members of crippled aircraft, especially helicopters. Conventional ejection seats are frequently bulky in size, costly in construction, and are not always reliable in operation whenever an ejection is attempted from an aircraft while it is in an unusual flight attitude, especially at low altitudes. Certain types of aircraft cannot be fitted with conventional rocket seat ejection systems because of limited space or incompatibility. An escape apparatus that may be retro-fitted to existing aircraft without the necessity of extensive structural changes is particularly desirable.

Prior art attempts to overcome the deficiencies inherent in conventional escape apparatus in which the entire seat and aircrew member are ejected from an aircraft have involved the use of a towline attached to a rocket motor to withdraw only the aircrew member. In these systems the rocket motor is forcibly ejected from the aircraft by some launching means to stretch the tow line taut between the rocket and the aircrew member for actuating an igniter on the rocket motor. The rocket has sufficient thrust to pull the load fastened to the tow line a safe distance from the aircraft for parachute deployment. This type of escape system, as well as conventional ejection seat systems, all rely on a precomputed optimum escape trajectory for safe egress from the aircraft. Once a seat system is designed, the trajectory it travels remains fixed regardless of the attitude of the aircraft at time of ejection. If the aircraft is in an inverted or steep bank attitude while close to the ground a successful ejection with a conventional ejection apparatus is not possible without the danger of fatal injury to the ejecting aircrew member. Additionally, conventional rocket ejection seats may not operate properly even though a level attitude is achieved at the time of initiation of the seat ejection sequence. If a high speed ejection is attempted, the air blast may pitch the seat forward or backward during egress resulting in trajectory instability and causing the seat to tumble. This could have an adverse effect upon proper parachute deployment.

SUMMARY OF THE INVENTION

The present rocket motor apparatus overcomes the disadvantages of the prior art rocket motors used in ejection or extraction apparatus for crew members of disabled aircraft by providing a simple, lightweight efficient rocket motor that is completely controllable at the time of ejection initiation. The rocket ejection apparatus follows a trajectory that provides optimum safety at time of ejection sequence by sensing various flight parameters, computing a trajectory, and controlling the thrust of the rocket nozzles to enable to rocket to fly the computed trajectory.

The rocket motor has a plurality of rocket nozzles mounted in opposing pairs about one end of an elongated rocket motor housing. The nozzles are directed away from the center line of the rocket and are angled toward the direction of the load which is connected to the rocket by a tow line. A valve proportions thrust between each nozzle pair. By arranging two nozzle pairs orthogonally to each other and by proportioning thrust between opposite members of each nozzle pair, control of rocket pitch and yaw is achieved. Rate and position sensing equipment provides the rocket with information regarding its attitude so that the optimum path may be flown.

A feature of the rocket motor is its utilization of a high energy propellant to develop sufficient force in a short period of time to extract an aircrew member from a disabled aircraft.

BRIEF DESCRIPTION OF THE DRAWING

Further advantages of the present invention will emerge from the description which follows of an embodiment of a steerable extraction rocket motor according to the invention, given with reference to the accompanying drawings, in which.

DESCRIPTION OF THE PREFERRED EMBODIMENT

Figure 1:
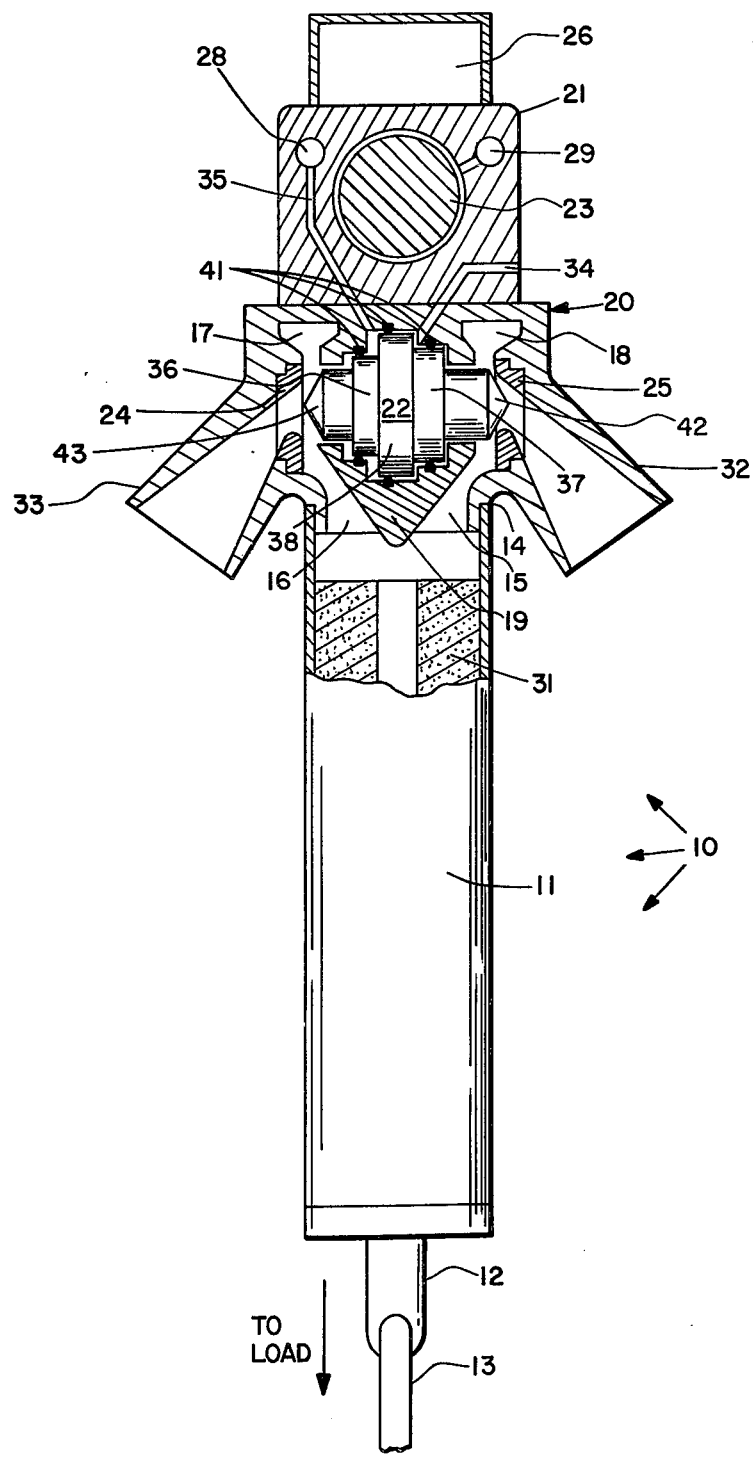
FIG. 1 is a partial longitudinal sectional view of a steerable extraction rocket.

Referring now to the drawings wherein like reference numerals correspond to like parts and elements throughout the several figures there is shown in FIG. 1 steerable extraction rocket 10 having tow attachment means 12. A towline 13 is attached at one end to attachment means 12 and on the other end to a load. Rocket motor casing 11 is a hollow cylindrical elongated housing having towline attachment means 12 securely fastened to one end by means of screw threads, welding or the like, and having nozzle member 20 attached to the other end at 14 by means of screw threads, welding, or the like. Nozzle member 20 defines gas passageways 15 and 16 which conduct high pressure gas from the combustion chamber inside motor casing 11 to annular plenum chambers 17 and 18.

Towline attachment means 12 also incorporates a well known rocket motor igniter, not shown, which initiates combustion of solid propellant 31 within motor casing 11 when towline 13 becomes taut. Gas pressure in motor casing 11, created by burning propellant 31, communicates through passageways 15 and 16 to annular plenum chambers 17 and 18. Depending upon the position of yaw nozzle proportioning valve 22, the high pressure gas in plenum chambers 17 and 18 escapes through nozzles 32 and 33. Valve 22 may alternately fully open or fully close nozzles 32 and 33 or may proportion the escaping high pressure gas between them.

The position of valve 22 may be controlled by many different means. One such means is illustrated in FIG. 1 where valve 22 is formed to have three regions of increased diameter. Small diameter 36, middle diameter 37, and large diameter 38 are each sealed by sealing rings 41 to create four separate pressure regimes within valve housing 19. Normally, combustion chamber pressure in plenum chambers 17 and 18 acts against the exposed faces on small diameter 36 and middle diameter 37. Because middle diameter 37 presents a greater face area to combustion chamber pressure than does small diameter 36, the force against the face of middle diameter 37 from this pressure moves valve 22 to close nozzle 33. At this time total rocket yaw thrust is being produced by nozzle 32. Internal passageways (not shown) connect electrically operated spool valve 28, with combustion chamber pressure and atmospheric pressure. As the extraction rocket nears a predefined yaw attitude, electrically actuated spool valve 28, in response to guidance signals from onboard rate and position sensing equipment, applies combustion chamber pressure by way of gas pressure conduit 35 to the exposed face of large diameter 38. Now the exposed face of large diameter 38 is exposed to combustion chamber pressure which results in a net force tending to move valve 22 to close nozzle 32. As the extraction rocket assumes its predefined yaw attitude, the pressure supplied by electrically actuated spool valve 28 to the exposed face of large diameter 38 is reduced to balance the pressure forces on valve 22 and to center valve 22 midway in its travel causing equal yaw thrust through each of nozzles 32 and 33. Spool valve 28 may supply combustion chamber pressure, atomspheric pressure, or a pressure anywhere between these two extremes for modulating the position of valve 22. The face of large diameter 38 opposite the face supplied by gas pressure from conduit 35 is vented by atmospheric vent 34 to prevent trapped gas pressure from interfering with the controlled movement of valve 22. Valve 22 also has oppositely disposed pointed ends 42 and 43 which seal against nozzle valve seats 25 and 24 respectively.

Figure 2:
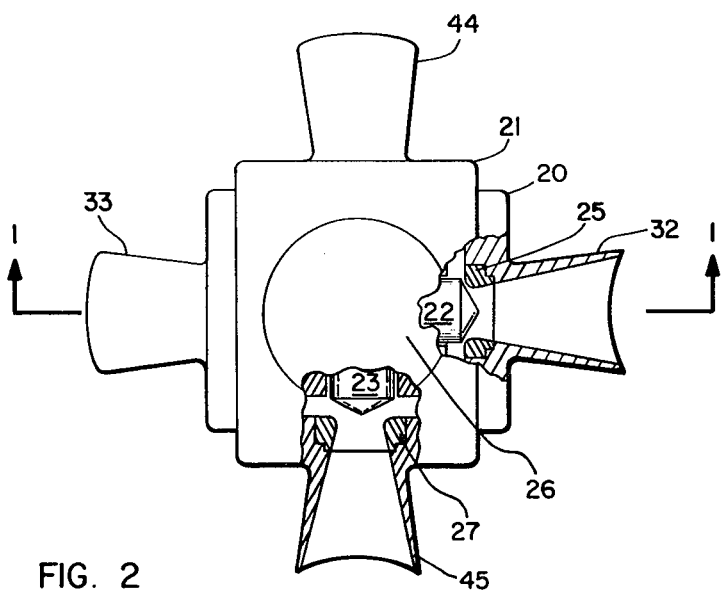
FIG. 2 is an end view, partially in section, of a steerable extraction rocket.

Of course, pitch nozzles 44 and 45 shown in FIG. 2 are controlled by pitch nozzle proportioning valve 23 in exactly the same manner as are yaw nozzles 32 and 33. Electrically actuated spool valve 29 controls the position of pitch nozzle proportioning valve 23 and thereby controls the relative thrust of pitch nozzles 44 and 45 relative to each other. Both electrically operated spool valves 28 and 29 are mounted within pitch nozzle member 21 and communicate with both combustion chamber pressure and atmospheric pressure through passageways in pitch nozzle member 21 which are not visible in FIG. 1. Pitch nozzle proportioning valve 23 seals against valve seat 27 in pitch nozzle 45 as shown in FIG. 2 and an identical arrangement exists in pitch nozzle 44.

Electronic rate and position sensing apparatus as well as trajectory computing apparatus or other electronic equipment required to guide the rocket along a predetermined trajectory may be carried within compartment 26.

Figure 3:
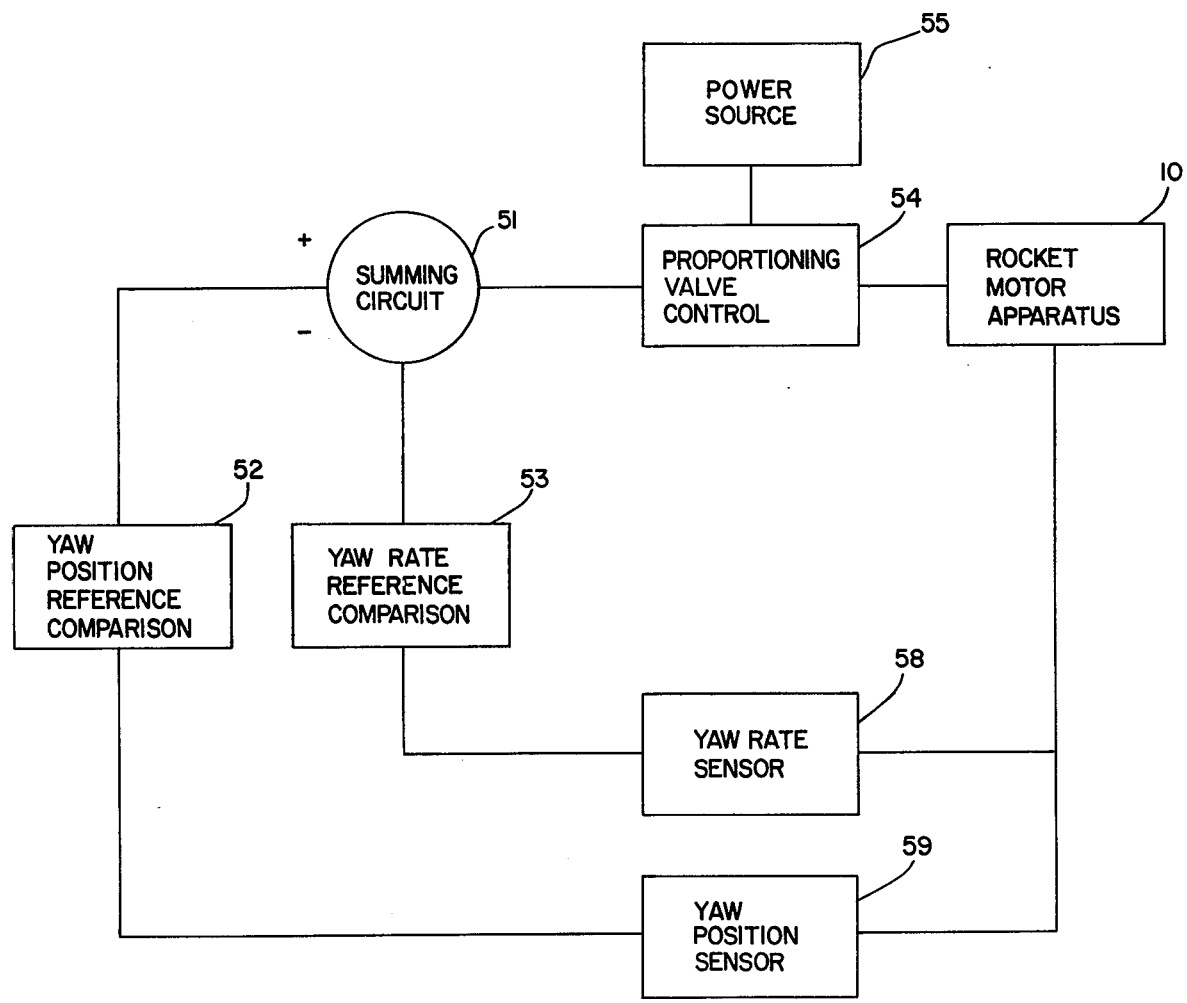
FIG. 3 is a block diagram illustrative of a control system for programming rocket flight trajectory.

Referring now to FIG. 3 which shows a block diagram of the yaw nozzle control system, and bearing in mind that an identical control system also exists to control the pitch nozzles, there is shown rate sensor 58 and position sensor 59 which sense the rate of yaw and yaw attitude at every point in the trajectory after ejection sequence initiation. Rate sensor 58 produces a signal which is compared by rate reference circuit 53 to a predetermined yaw rate or to a computed desirable yaw rate and the amount of yaw thrust necessary to correct the error between actual yaw rate and desired yaw rate is fed to summing circuit 51. Similarly position sensor 59 sends position information to position reference circuit 52 which compares rocket position to a constant or computed desirable position and feeds the yaw thrust correction into summing circuit 51. Summing circuit 51 computes the net desired change in yaw thrust to eliminate both rate and position error and sends a signal to gas valve control 54 which controls the valve proportioning thrust between yaw rocket nozzles. Power source 55 supplies energy to gas valve control 54 to enable it to control the yaw nozzle valve. As yaw thrust changes, rocket motor apparatus 10 assumes a new rate and new attitude and this information is fed back into rate sensor 58 and position sensor 59 where the process repeats itself until the error in position and rate of rocket motor 10 is eliminated. As previously stated a second control system simultaneously controls pitch so that the rocket is controlled in both pitch and yaw.

In normal operation the rocket is stowed within the aircraft and upon initiation of ejection sequence the rocket motor is catapulted from the aircraft. When towline 13 becomes taut a rocket motor initiator (not shown) ignites propellant 31 within rocket motor casing 11. The onboard guidance equipment carried in compartment 26 then determines from the attitude and rate of the aircraft prior to ejection, as well as from the attitude and rate of the rocket motor after ejection, the optimum trajectory to fly for maximum crewmember safety according to preprogrammed safety criteria.

The rocket may obtain position and rate information from electronic devices mounted in the aircraft just prior to ejection sequence initiation, and during ejection follow a predetermined trajectory based on the initial data. As an alternative system, the rocket may contain the position and rate sensing means and constantly adjust its trajectory as it flys. Also, a preprogrammed trajectory may be built into the rocket so that regardless of its attitude when launched it will follow the preprogrammed trajectory or seek a predetermined attitude. The means for controlling thrust to steer the rocket may be many different types of mechanisms. One such mechanism previously described is a pressure controlled valve having different diameters and having modulated pressures acting against the sides of these diameters. Another steering method may utilize a solenoid to control the position of each proportioning valve, or mechanical means, such as an arrangement of springs and levers may be used.

The position of the rocket nozzles may be in opposed staggered pairs as shown in FIG. 1 positioned at the end of the rocket opposite the end to which the towline is attached. Other configurations may have the rocket nozzles positioned at the towline end of the rocket exhausting away from the rocket centerline and angled toward the towed object. The rocket nozzles may also be in the same plane instead of being staggered longitudinally, although this complicates the required nozzle valving arrangement. The rocket may utilize three nozzles symmetrically positioned about the circumference of the rocket or may position the nozzles nonsymmetrically and vary their thrust capacities by varying their throat diameters and nozzle sizes. The steerable extraction rocket may also utilize a single thrusting nozzle and a roll rate nozzle which rotates the rocket to position the single thrusting nozzle in the desired direction for flying the desired trajectory. This arrangement may result in a rocket which always flies in a curved path, although since the duration of powered flight is typically less than two seconds, a curved path may well be advantageous.

Obviously many modifications and variations of the present invention are possible in the light of the above teachings. It is therefore to be understood that within the scope of the appended claims the invention may be practiced otherwise than as specifically described.

We claim:

1. A rocket motor for towing a load along a flight trajectory away from an aircraft, comprising:
   an elongated casing having first and second ends, a longitudinal axis, and having tow means fastened at said first end;
   a propellant charge contained within said elongated casing for generating a high pressure gas;
   a rocket nozzle housing rigidly attached to one end of said elongated casing, said rocket nozzle housing defining a plurality of apertures therethrough forming opposed rocket nozzle pairs for creating thrust by exhausting said high pressure gas from said elongated casing;
   rocket nozzle closure means controlling each of said opposed rocket nozzle pairs of varying the rate of gas flow through each of said nozzles;
   said rocket nozzle closure means having first and second opposed conical ends spaced from a stepped cylindrical center section, said center section defining first, second, and third diameters wherein said first diameter is larger than said second diameter and is located between said second and third diameters, and said second diameter is larger than said third diameter, each of said first, second, and third diameters being sealingly retained in sliding relationship with said rocket nozzle housing;
   said first and second diameters defining a first annular face; said first and third diameters defining a second annular face; said second diameter and said first conical end being spaced apart to define a first cylindrical region having a diameter which is smaller than said third diameter, and a third annular face; said third diameter and said second conical end being spaced apart to define a second cylindrical region having a diameter equal to the diameter of said first cylindrical region, and a fourth annular face; said third and fourth annular faces, first and second cylindrical regions, and first and second conical ends all being exposed to said high pressure gas when said propellant charge is ignited;
   said housing, first and second diameters, and first annular face defining a first volume; said housing, first and third diameters and second annular face defining a second volume; said first and second opposed conical ends being positioned to alternately open and close two of said rocket nozzles by reciprocative sliding motion of said rocket nozzle closure means therebetween;
   sensing means for generating signals in response to the motion of said rocket motor; and
   control means connected to said sensing means and operatively connected to said rocket nozzle closure means for selectively operating said closure means in response to signals from said sensing means;
   said control means being operable to selectively supply said high pressure gas to said second volume, said first volume being maintained at ambient pressure.

2. The rocket motor apparatus of claim 1 wherein said rocket nozzle closure means is a valve.

3. The rocket motor apparatus of claim 1 wherein said rocket nozzles are at least three in number, spaced an equal distance from the center of said elongated casing, and adjacent nozzles are spaced an equal distance from one another around the outer surface of said rocket nozzle housing.

4. The rocket motor apparatus of claim 1 wherein said sensing means includes a rate sensor and a position sensor.

5. The rocket motor apparatus of claim 1 wherein said rocket nozzle housing is attached to said first end of said elongated casing.

6. The rocket motor apparatus of claim 1 wherein said rocket nozzle housing is attached to said second end of said elongated casing.

7. The rocket motor apparatus of claim 2 wherein said elongated casing is cylindrical in shape, and said rocket nozzles are four in number, arranged in opposing pairs, and each pair is orthogonally positioned relative to the other pair.

8. The rocket motor apparatus of claim 7 wherein said rocket nozzle pairs are spaced from each other along the longitudinal axis of said elongated casing.

* * * * *